Aug. 16, 1932.  J. P. CROWLEY  1,872,416
APPARATUS FOR GRINDING SHEET GLASS
Filed Aug. 2, 1922   5 Sheets-Sheet 3
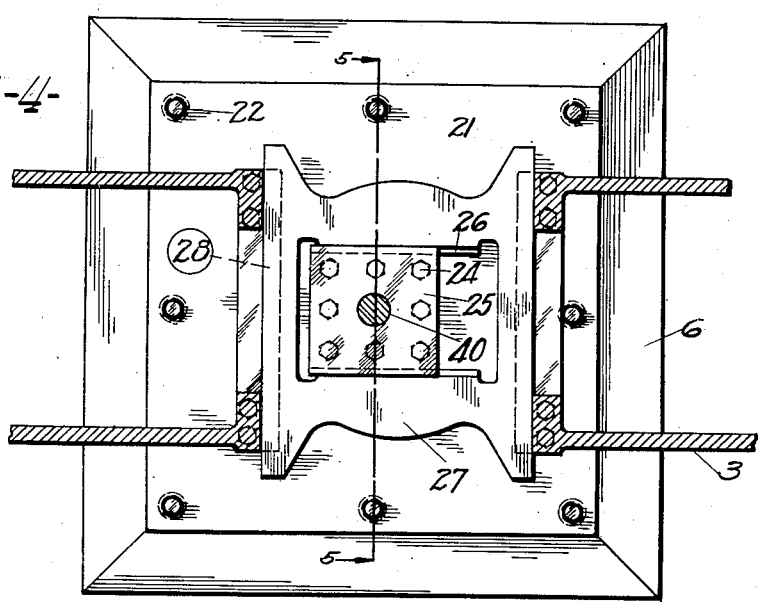
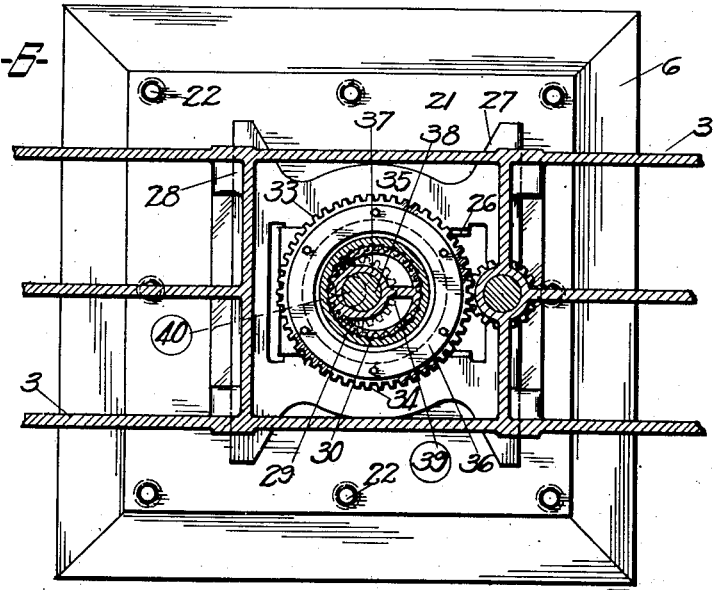
INVENTOR
Joseph P. Crowley
BY C.A.Rowley
ATTY.

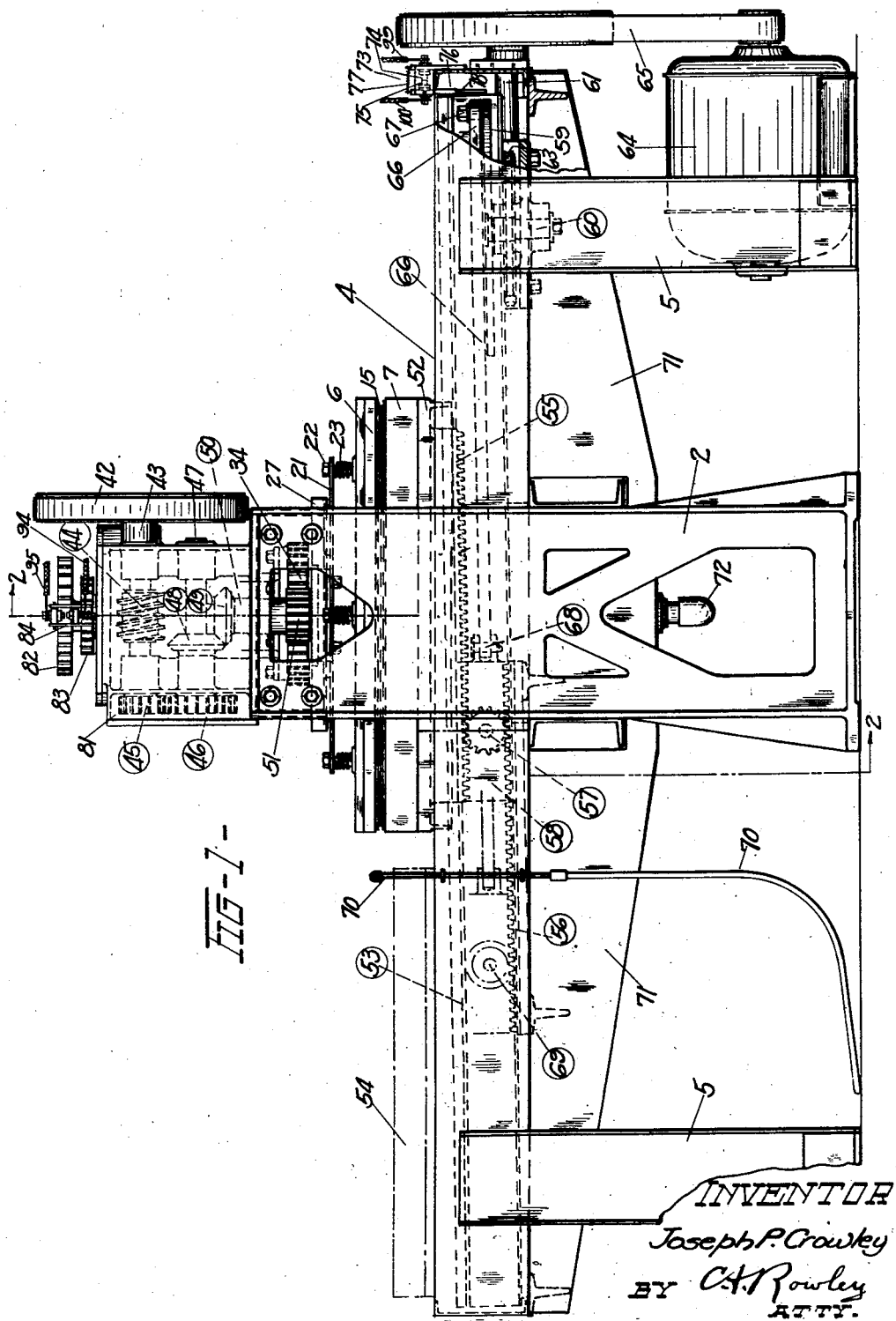

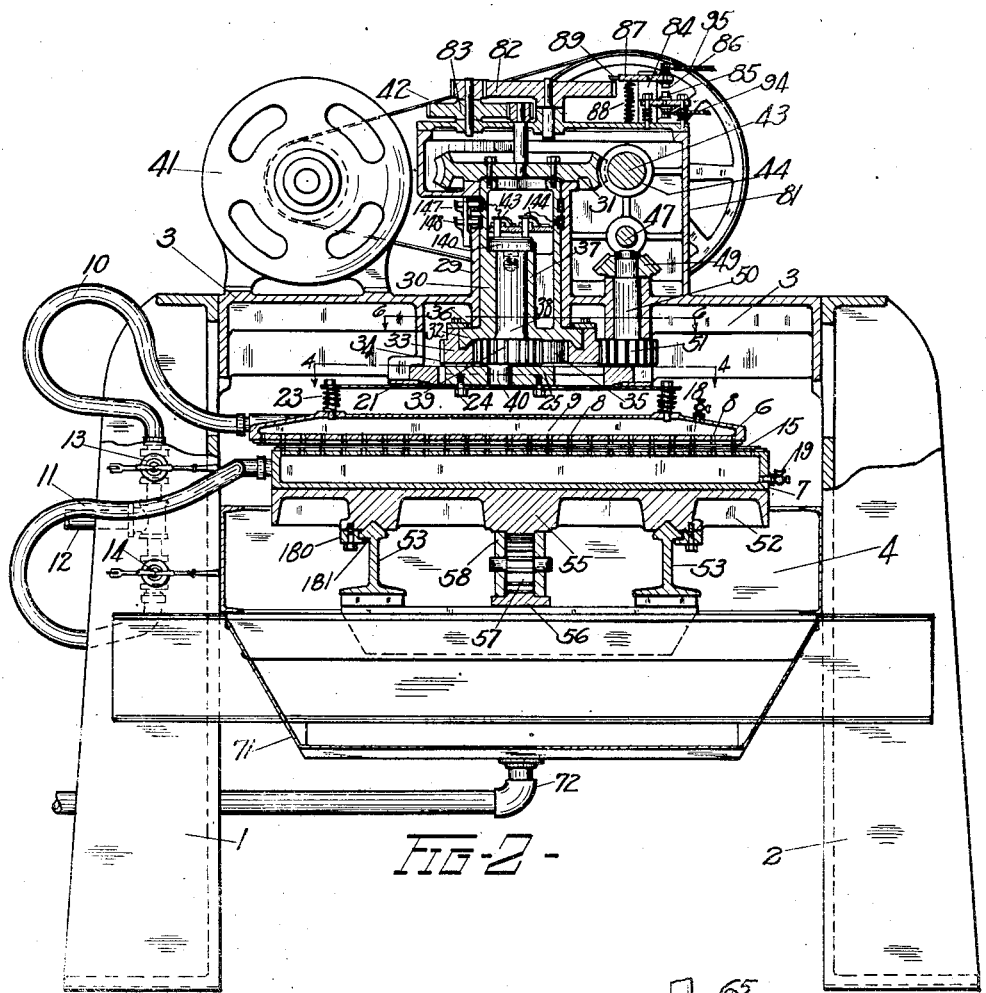
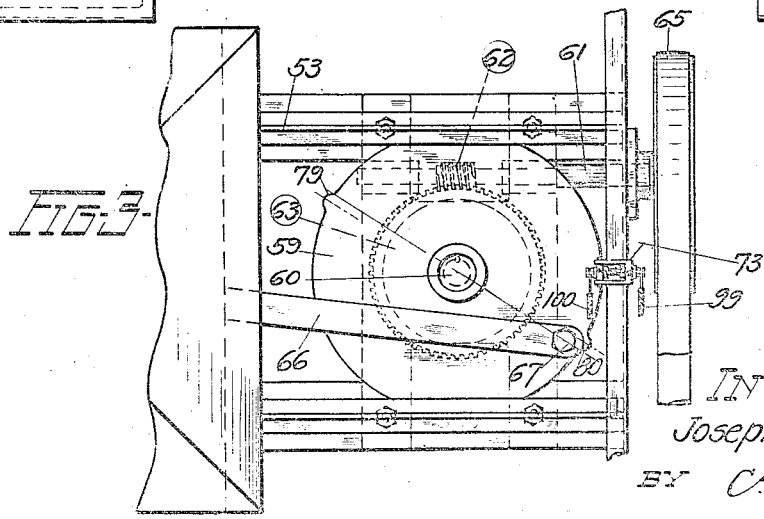

Aug. 16, 1932.  J. P. CROWLEY  1,872,416
APPARATUS FOR GRINDING SHEET GLASS
Filed Aug. 2, 1922  5 Sheets-Sheet 4
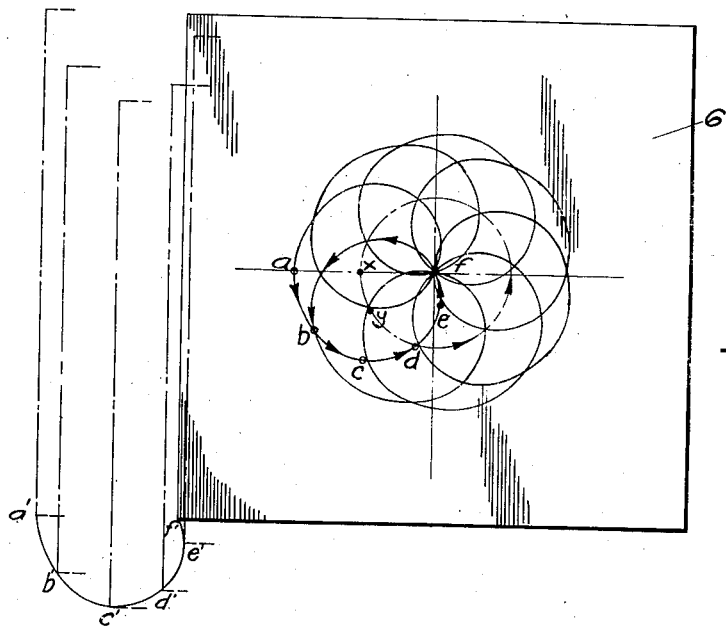
FIG-9-
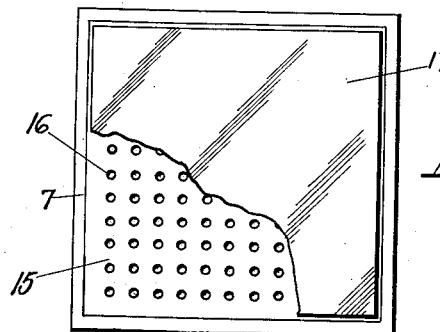
FIG-7-
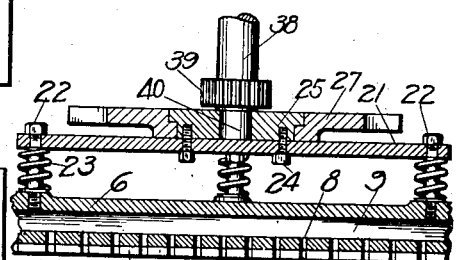
FIG-5-
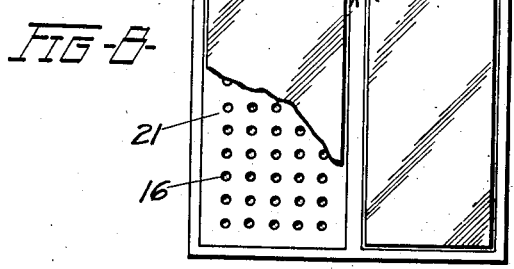
FIG-8-
INVENTOR
Joseph P. Crowley
BY C A Rowley
ATTY.

Aug. 16, 1932. J. P. CROWLEY 1,872,416
APPARATUS FOR GRINDING SHEET GLASS
Filed Aug. 2, 1922 5 Sheets-Sheet 5
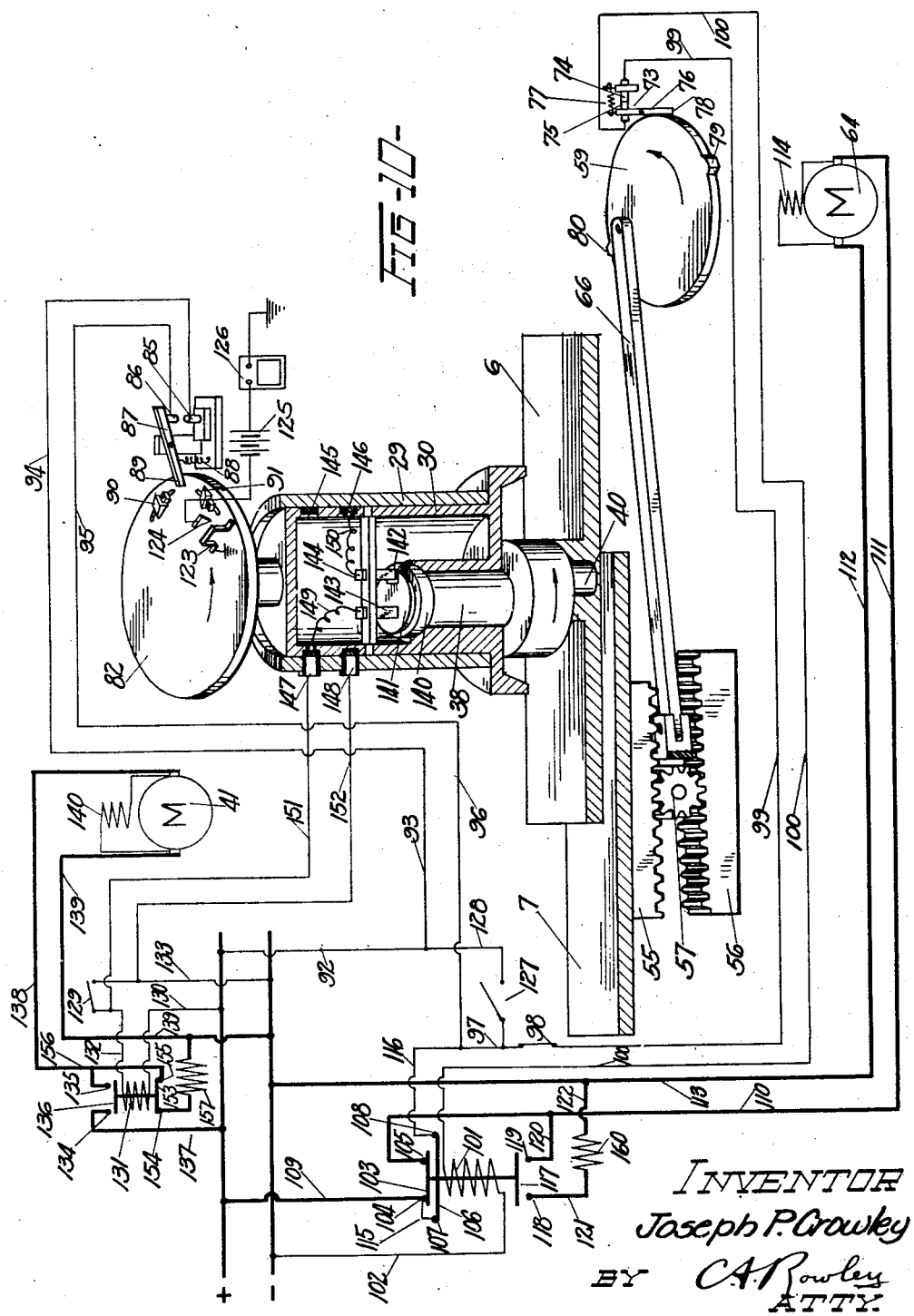
INVENTOR
Joseph P. Crowley
BY C. A. Rowley
ATTY.

Patented Aug. 16, 1932

1,872,416

UNITED STATES PATENT OFFICE

JOSEPH P. CROWLEY, OF TOLEDO, OHIO, ASSIGNOR TO LIBBEY-OWENS-FORD GLASS COMPANY, OF TOLEDO, OHIO, A CORPORATION OF OHIO

APPARATUS FOR GRINDING SHEET GLASS

Application filed August 2, 1922. Serial No. 579,093.

This invention relates to an apparatus for grinding sheet glass, to provide smooth, absolutely flat surfaces on the sheets. The present application is a division in part of my prior application, Serial No. 502,655, filed Sept. 23, 1921.

In the usual sheet glass grinding system, a series of sheets are cemented to the top of a large rotary table, and over the top of this table a series of grinding tools are continuously moved which eventually smooth down the exposed faces of the sheets. It is then necessary to remove the sheets from the table turn them over, and repeat the operation to grind the other faces. This is necessarily a long and tedious process.

The principal aim of the present invention is to greatly shorten and simplify this grinding operation. In the system here disclosed, a pair of similar glass sheets or a plurality of similar pairs, are ground one against the other, suitable abrasive being used between the two sheets. In this way the output of the machine is doubled, since each grinding operation produces two ground surfaces instead of one.

A further object of the invention is to provide a machine for accomplishing this grinding process, comprising a pair of opposed sheet supporting tables, to which the glass sheets are held by suction. In this way the sheets are quickly inserted and held within the apparatus, and are easily removed. Furthermore, a sheet may be transferred from the lower to the upper table, or vice-versa, without removing the sheet from the machine.

A further object is to provide a mechanism for imparting to one of the sheets a lateral shifting movement in its own plane, whereby continually different surfaces of the two sheets will be brought in grinding contact.

A further object is to provide an automatically operable mechanism to separate the sheets at intervals, during which the ground glass may be washed off and the abrasive renewed, and again bring the sheets into grinding contact.

Another object is to provide an electric control system for the apparatus, whereby the parts may be stopped and started at the desired times and in the proper relative positions.

Other objects and advantages of the invention will become apparent as the following detailed description proceeds.

In the accompanying drawings:

Fig. 1 is a side elevation of the apparatus, looking from the right of Fig. 2.

Fig. 2 is a transverse vertical section through the machine, taken substantially on the line 2—2 of Fig. 1, some of the parts however being shown in elevation.

Fig. 3 is a plan view of a portion of the mechanism for reciprocating the lower sheet-supporting table. The positions of the crank-disc and pitman are shifted slightly from their positions in Fig. 1.

Fig. 4 is a horizontal section, on an enlarged scale, taken substantially on the line 4—4 of Fig. 2. This view shows the slides which compel the sheet supporting table to remain parallel with fixed axes.

Fig. 5 is a vertical section through these slides, as well as a portion of the upper supporting table, the section being taken substantially on the line 5—5 of Fig. 4.

Fig. 6 is a horizontal section, on an enlarged scale, taken substantially on the line 6—6 of Fig. 2.

Fig. 7 is a plan view of one of the sheet supporting tables. The glass sheet is partly broken away to reveal the holding platen therebelow.

Fig. 8 is a view similar to Fig. 7 of a modified form of table adapted to simultaneously hold a plurality of separate sheets.

Fig. 9 is a diagram to illustrate the shifting or grinding movement imparted to the upper sheet holding table.

Fig. 10 is a wiring diagram, certain portions of the machine being included conventionally in perspective.

The apparatus here shown and about to be described, is designed more particularly to grind comparatively small sheets, or lights, such as those used for small windows, or automobile wind-shields. The apparatus is more especially adapted for grinding drawn sheet glass, which is already comparatively flat and smooth, and does not require the removal of very much material. However, the principles illustrated are entirely applicable to a larger machine, and rolled or pressed sheet glass of any size could be ground in this way.

The supporting frame may be of any suitable form to rigidly sustain the operating parts, and still permit as free access as possible to the grinding tables. As here shown it comprises a pair of similar castings 1 and 2, sustained at their lower ends by a suitable floor support, and joined at their upper ends by a horizontal casting 3, which carries the grinding motor, and in which are journaled the various parts of the shifting mechanism for the upper table. A rather long supporting structure 4 for the lower sheet-holding table, is centrally supported by the castings 1 and 2, and is supported at the two ends by leg members 5.

The sheet holding tables 6 and 7 are mounted horizontally within this framework at such a height that they are easily accessible to a workman standing beside the machine. Each of these tables is a rigid metallic structure, having a flat plane sheet holding surface in which are a series of small holes 8, communicating with a chamber 9 within the table body. Flexible air-pipes 10 and 11, connect the tables 6 and 7 respectively with a main conduit 12 leading to a vacuum tank, in which a suitable vacuum is constantly maintained. Hand-operated valves 13 and 14, mounted in an accessible position on the frame 3, control the connections to the vacuum tank, whereby the air may be partially exhausted at will from either or both of the tables 6 and 7. The sheet holding faces of the two tables 6 and 7 are substantially identical, and each is provided, (Fig. 7), with a cover or platen 15 of rubber or similar material. This platen is provided with a series of holes 16, registering with the holes 8 in the table, and the suction through these holes 8 and 16, serves to securely hold the glass sheet 17 against the table face during the grinding operation, or as long as the vacuum connection with the table is maintained. The rubber platen 15 will give sufficiently to allow uneven or "wavy" glass to be held thereagainst without breakage, and at the same time aids in establishing an airtight connection with the glass sheet. The tables 6 and 7 are provided with relief-valves or pet-cocks 18 and 19, the valve 19 also serving as a drain for the water that may work in to the lower table through the holes in the sheet supporting surface.

The tables 6 and 7 may be constructed as in Fig. 7, where only a single pair of sheets are to be ground, or may be of the form shown in Fig. 8, which is designed to simultaneously grind two pairs of sheets 20. In this case, separate platens 21 for each sheet may be used, or a single large platen, such as 15 in Fig. 7, may be used, the transverse rows of holes lying between the several pairs of sheets being omitted or plugged up. In any case it is to be understood that the shape of the table top here shown is merely illustrative. These tables might be made larger, smaller, longer or wider, or designed to hold any number of sheets of any size or shape, without necessitating any variation in the operating mechanism now to be described.

When the holding tables are designed to carry a plurality of sheets as in Fig. 8, the distance $x$ between any two sheets is preferably greater than the extreme amplitude of the shifting movement of the movable table (as hereafter described), so that each sheet on the movable table grinds against and contacts with only its companion sheet on the fixed table, and never touches any other sheet.

The upper, shifting, or grinding table 6 is suspended from a plate 21, by a series (here shown as eight) of bolts or pins 22, (see Fig. 5), there being compression springs 23 surrounding the bolts between the table and the supporting plate. The upper ends of bolts 22 slide freely through the plate 21, so that the table 6 may always adjust its lower flat face to the corresponding upper surface of table 7. When table 7 is elevated to operating position, as later described, table 6 rests thereon by its own weight together with the added pressure of springs 23.

The table-carrying plate 21 is rigidly secured to, as by screw-bolts 24, and travels with, a slide-plate 25, which is mounted to reciprocate in slideways 26 in a second plate 27, which in turns reciprocates at right-angles to plate 25, in slide-ways 28 in the frame-member 3. This slide 27 allows a movement of translation of the table 6 along its longitudinal axis, (relative to supporting table 4), whereas slide 25 allows a movement of translation along the transverse axis of the table 6. Since the two slides may operate simultaneously at the same or different speeds, a combined movement of translation in its own plane in both directions may be imparted to the table, thus giving it a bodily shifting movement through any curved path, within the limits allowed by the travel of the slides. At the same time these slides prevent any turning or twisting movement of the table, its respective edges always remaining parallel with their initial position, in which they are parallel with, and coincide as closely as possible with, the edges of the lower table 7.

As one approved means of shifting this table 6 through a closed curved path, which will bring constantly changing portions of the two glass sheets into grinding engagement, the following system of planetary gearing has been provided. Mounted centrally of the machine in a vertical bearing 29 in frame member 3, is a partially tubular sleeve-member or hollow column 30. Secured to the upper end of sleeve 30, beyond the bearing 29, is a driving worm-gear 31. Carried by an outwardly flaring flange 32, at the bottom of the sleeve 30, below bearing 29, is an annular or ring gear 33, having an outer set of teeth 34, as well as a set of internal teeth 35. This annular gear 33 is held in position around the flange 32, by the annular flange-ring 36, as shown in Figs. 2 and 6. Journaled in an eccentric boss 37, within the sleeve 30, is a vertical stub-shaft 38. Secured to the lower end of stub-shaft 38 is a gear 39 which meshes with the internal teeth 35 of annular gear 33. This gear 39 has an eccentric driving pin or projection 40, which is journaled in and imparts motion to the slide 25, already described. Preferably, for reasons later set forth, the eccentricity of pin 40 with respect to gear 39 is just equal to the eccentricity of stub-shaft 38 with respect to sleeve 30. In this way, once during each revolution of pin 40, it will be centered with the sleeve 30. When pin 40 is in this centered position, the edges of tables 6 and 7 are in vertical alignment, that is the faces of the two tables, and hence of the glass sheets carried thereby, practically coincide.

Motion is imparted to the gearing just described from an electric motor 41, preferably mounted on frame 3, and connected by belt 42 with drive shaft 43. This shaft 43 carries a worm 44, meshing with and driving the worm-wheel 31 on sleeve-member 30. Shaft 43 also carries a spur-gear 45, driving a similar gear 46, on horizontal shaft 47, which carries bevel-gear 48, driving bevel-gear 49 on the vertical shaft 50. Shaft 50 carries a spur-gear 51, meshing with and driving the external teeth 34 on annular gear 33. In this way, shaft 38, and pin 40, are each caused to revolve through different orbits and at different speeds but in the same direction. Shaft 38, being eccentrically mounted in sleeve 30, revolves about the axis of the sleeve. Pin 40 revolves in a circle of similar radius, about the axis of shaft 38. The worm drive 44 and 31 for sleeve 30, has such a speed relation to the train of gears 45, 46, 48, 49, 51, 33 and 35, which rotate gear 39, that, in the example here shown, the pin 40 will make seven revolutions about the axis of shaft 38, while shaft 38 is making one revolution about the axis of sleeve 30. This ratio of speeds is only illustrative, the only requisite being that the shaft 38 revolves considerably slower than the pin 40.

Since pin 40 revolves about the axis of shaft 38 while shaft 38 is also revolving about a different fixed center, it will be apparent that a compound rotative movement is imparted to the pin 40, and hence to all points on the shifting table 6. The curved path followed by this pin 40 is indicated in the diagram shown in Fig. 9. The outline of table 6 is also indicated in this diagram, although it must be understood that the motion curve is enlarged out of proportion to the table 6, as here shown. In this Fig. 9, the solid line outline indicates the position of table 6 when it is centered and in vertical alignment with the lower table 7. Let us assume first that the table 6 and associate parts are in the relative positions indicated in Figs. 1 to 6. The shaft 38 and pin 40 are now at the extreme left-hand limit of their movement, as seen in Fig. 2, and the centers of pin 40 and shaft 38 lie along the transverse centerline of the tables. The transverse edges of tables 6 and 7 are now in vertical alignment, but table 6 projects beyond table 7, to the left, (Fig. 2), a distance equal to the combined eccentricities of pin 40 and shaft 38. In Fig. 9, the position of the axis of pin 40 is indicated at $a$, the outline of the left-hand end of table 6 is indicated in dotted lines at $a'$, and the axis of shaft 38 will be located at $x$. As the parts move in the direction of the arrows, pin 40 will pass through the successive positions $a$, $b$, $c$, $d$, $e$ and $f$, while the corresponding positions of table 6 are indicated at $a'$, $b'$, $c'$, $d'$, $e'$, and $f'$, respectively. When the pin 40 reaches the position $f$, it is centered with the axis of sleeve 30, and the outlines of tables 6 and 7 now coincide, as indicated at $f'$. While this movement of pin 40 has been taking place, shaft 38 has moved from the position $x$ to the position $y$. Consequently the next revolution of pin 40 will take it along a different path from the preceding revolution as the center about which it revolves is also advancing along a circular path. As the edges, or axes, of the table 6 always remain parallel to their initial position, it will be apparent that each and every point on the table 6, has the same and equal movement through space, along parallel paths, the path of each point being that indicated for the pin 40. In this way continually changing portions of the glass sheets carried by the tables 6 and 7 are brought into grinding contact. It will here be noted that once during each revolution or loop of pin 40, its axis coincides with that of sleeve 30, and hence the tables 6 and 7 are lined up once during each loop, although this is the only point or position that the successive loops have in common. It is desirable, although not absolutely necessary, that the two tables be in vertical alignment whenever the operating or moving parts are stopped, and mechanism is provided, which will be described later, for compelling the table 6 to stop when the power is shut off, at the next succeeding time when pin 40 reaches that point in the loop when it lies in the axis of sleeve 30. At this time the tables will be in alignment.

Before describing the control mechanism just referred to, the mechanism for automatically moving the lower table 7 into and out of grinding engagement with the upper table 6 will be described. As here shown the table 7 is supported on a second table or block 52, which is slidably mounted on rails or trackways 53 carried in the frame 4. The rails 53 are slightly inclined to the horizontal, so that as the table 7 and 52 are moved away (to the left, Fig. 1), they will be simultaneously lowered away from the table 6. When the table 7 is moved back into grinding position, the tables, or the glass sheets carried thereby will not come into contact until the two tables are partially overlapped, after which the completion of the movement will result in a sliding engagement of the two sheets which will also elevate the upper table 6 somewhat against the resistance of springs 23. This sliding movement of the lower table into and out of grinding position is of particular advantage in the outward or disengaging process. When the two plates have been well ground down, there is considerable suction or adherence between them, and it is quite difficult to disengage them by a direct pull apart. They will, however, disengage quite easily by a sliding movement such as provided by this apparatus. Also, when the lower table 7 has been moved out to the position indicated by dotted lines 54 (Fig. 1), its upper face is entirely accessible for the purpose of washing off the sheet carried thereby, or applying new abrasive. Table 52 is held down firmly in position on rails 53, by removable flanges 180 which engage under the side flanges 181 of the rails.

To impart this in and out movement to the lower table 7, mechanism is provided including a rack 55, fixed to the bottom table 52, and a similar fixed rack 56 mounted in the frame 4. A pinion 57, meshing with these two racks, is carried in a frame 58, which slides along and is guided by the two racks 55 and 56. At the rear of the frame 4, between the rails 53, is mounted a horizontal crank-disc 59, carried by a stub-shaft 60. (See Figs. 1 and 3). The disc is driven from drive-shaft 61, through the worm 62 on shaft 61, and worm-wheel 63 keyed to stub-shaft 60. A motor 64 drives shaft 61 through belt 65.

A pitman or connecting-rod 66 is pivoted at one end to crank-pin 67 on the disc 59, and its other end is pivoted at 68 to the carriage or frame 58. When the crank-pin 67 is at the rear dead-center, as shown in Fig. 1, the tables 6 and 7 are in grinding position. When the disc 59 is rotated through 180°, and the crank-pin is on the other dead-center, the table 7 will have been moved out to its extreme outer position as indicated by dotted lines 54 in Fig. 1. The position of pinion 57 at this time is indicated by dotted lines at 69. It will be noted that due to the double rack arrangement, the travel of the table 7 in either direction is double that of the pinion 57 or crank-pin 67. This provides for an ample movement of the table, without having the operating mechanism excessively large.

A water-pipe 70, extending horizontally across the supporting frame 4, and having a series of apertures through which a constant drip of water may be maintained, will feed water to the surface of the sheet carried on table 7, as the latter is moved back or forth beneath this pipe. A drip-pan 71 is placed beneath the entire operating mechanism, and drains off the water and abrasives through drain-pipe 72.

It is desirable that, after the grinding operation has continued for a short time, the glass sheets be separated for an interval while the ground glass and worn abrasive is washed away and new abrasive, of perhaps a different grade, applied. Automatic stopping and starting mechanism for the motor 64, controlled from the shifting mechanism for upper table 6, is provided, whereby this separation, and return to grinding position, will be accomplished at fixed intervals. Referring to Figs. 1, 2 and 10, a normally closed switch 73, is located adjacent the disc 59. This switch comprises a fixed contact point 74, and a movable contact 75, carried by a lever 76, the contacts normally being held together by spring 77, connecting one end of lever 76 with a fixed portion of the switch. A projecting portion 78 at the other end of lever 76, lies in the path of either of two cams 79 and 80 carried by disc 59. Whenever either of cams 79 or 80 snaps past the projection 78, the circuit passing through contacts 74 and 75 will be momentarily broken.

At the top of the machine, above the housing 81, which encloses the shifting gearing for the upper table, is rotatably mounted a disc or gear 82, which is driven at a quite slow speed, from the table shifting mechanism. Preferably it is driven from the sleeve 30, through appropriate reducing gearing 83. Mounted adjacent this disc is a normally open switch 84, comprising fixed contact 85 and movable contact 86 carried by the switch lever 87. One end of lever 87 is normally held down by spring 88, and a projection 89 at the same end of the lever lies in the path of a pair of cams 90 and 91, which are adjustably fixed to the upper surface of disc 82. Whenever either cam 90 or 91 comes under the end 89 of lever 87, the switch will be closed by bringing together contacts 85 and 86, but this connection will be broken again by spring 88 as soon as the cam passes from beneath the projection 89.

In the wiring diagram shown in Fig. 10, only the main features of the wiring connections have been indicated, some of the starting rheostats and resistances having been omitted for the sake of clearness. At 64 is indicated the motor already described for rotating the crank-disc 59 to raise and lower table 7. The shunt-field of motor 64 is indicated at 114, and 160 is the resistance coil of a dynamic brake for this motor. Let us assume that table 7 is in grinding position against table 6, and that the table 6 is being given its shifting grinding movement in its own plane. The disc 82 will now be slowly rotating in the direction of the arrow and cam 90 will eventually come under the projecting end 89 of switch-lever 87 and close the switch contacts 85 and 86. A control circuit will now be established as follows: from the positive main through wire 92, wire 93, wire 94, contacts 85, 86 of switch 84, wires 95, 96 and 97, normally closed push-button switch 98, wire 99, contacts 74 and 75 of the normally closed switch 73, wire 100, coil 101 of the switch-operating solenoid, and wire 102 to the negative main. Now that magnet-coil 101 is energized, the core of the solenoid will be elevated (against the action of a spring not shown, which assists the weight of the core to maintain it in lowered position when the magnet coil is deenergized), and by means of contact plate 103 bridges the two contact points 104 and 105, and also independently closes by means of plate 106, the circuit through contacts 107 and 108. The main motor circuit is now completed as follows: from the positive main through wire 109, contact 104, plate 103, contact 105, wires 110 and 111, motor 64, wires 112 and 113 to the negative main. Since the shifting mechanism for the upper table 6 is running continuously, the cam 90 will almost immediately pass out from under the projection 89, and the operating control circuit will be broken at 85, 86. This would allow the solenoid to drop and cut off the supply current to the motor 64. To prevent this a shunt circuit through the magnet coil 101 of the solenoid is established as follows: from the positive main, through wires 109 and 115, contact 107, plate 106, contact 108, wires 116 and 97, and thence as before through 98, 99, 74, 75, 100, 101, 102 to the negative main. By means of this parallel circuit the solenoid will be maintained in its upper operative position after the first established circuit is broken at 85, 86. Crank-disc 59 will now be rotated in the direction of the arrow, by motor 66, and the table 7 will be moved down and to the left away from the table 6. As shown in Fig. 10, the table 7 is thus being shifted. At the time that pitman 66 reaches its forward dead-center on crank-disc 59, and table 7 is in its outermost position, the cam 79 on disc 58 will pass momentarily under projecting end 78 of switch-lever 76 and break the circuit last described at 74, 75. Coil 101 being deenergized, the solenoid will now drop breaking both the control circuit and the main motor circuit at the points 107, 108 and 104, 105. At the same time the contact plate 117, at the lower end of the solenoid core will bridge the contacts 118 and 119, thus short circuiting the motor armature through the resistance 160 as follows: from motor 64, through wires 111, 110, 120, contact 119, plate 117, contact 118, wire 121, resistance 160, wires 122, 113 and 112 back to motor 64. As is well-known in the action of dynamic brakes, this throws an electrical load on the motor 64 (now acting as a dynamo), and this load almost instantly overcomes the momentum of the moving parts and stops the motor.

Table 7 will now remain in outer position for an interval of time sufficient to wash off the ground glass and abrasive and apply new abrasive. The length of this period may be regulated by adjusting the distance between the cams 90 and 91 on the disc 82. When cam 91 comes under the end 89 of switch lever 87, the contacts will be again closed at 85 and 86. It should be noted that before the table 7 was stopped in its lowered position, the cam 79 has passed completely under the lever-end 78, and switch 73 was again in its normally closed condition. The first described control circuit is now again completed, the motor 64 is again supplied with current, and the table 7 will be raised to its operative position. Just before it reaches this upper position the control circuit is again broken by cam 80 snapping under switch-lever end 78, and opening the contacts 74, 75. This again allows the solenoid to drop, opens the control circuit and the main motor circuit, and applies the dynamic brake. Since the pitman 66 is now at its rear dead-center position the table 7 will be held up against the table 6 for a grinding period determined by the length of the long arc between cams 91 and 90 on disc 82, and also by the ratio of the reduction gearing used between the sleeve 30 and the disc 82. Both of these may be varied to give the desired duration to the grinding period.

Conveniently placed on and adjacent to the disc 82, are a pair of contact devices 123 and 124. The contact 123 on the disc may snap under the spring contact 124, and the parts are so placed that this contact will take place a few seconds before cam 91 engages end 89 of switch lever 87 to close the control circuit and raise table 7 to its upper position. A circuit from a battery 125 passes through a buzzer 126, or other suitable device, and through the contacts 123 and 124, the two ends of the battery circuit being grounded on portions of the machine, all as indicated near the top of Fig. 10. This buzzer acts as a warning signal to the operator, that the table 7 is about to be moved back into grinding position under table 6, so that the operator's hands, and any tools that may be used, can be removed, and accidents avoided.

In order that the motor 64 may be started or stopped at any time, regardless of the automatically operating circuits just described, the manually operated switches 127 and 98 are provided. The switch 127 is normally open but may be momentarily closed by means of a push-button. The switch 98 is normally closed but may be momentarily broken or opened by means of a push-button. When switch 127 is closed, a circuit is established from the positive main, through wires 92, 128, switch 127, wire 97, switch 98, and thence through 99, 74, 75, 100, 101, 102 and the negative main, as before. This will start the motor, in the same way that switch 84 starts the motor. It will be noted that the control circuit in all cases passes through the switch 98, so that whenever this switch is opened the control circuit is broken. In this way the motor may be stopped at any time regardless of the position of the parts.

A somewhat similar operating circuit is provided for the motor 41, which drives the shifting mechanism for the upper table 6.

This motor is started by closing the hand-switch 129. A control circuit is then established from the positive main through wire 130, starting-solenoid coil 131, wire 132, switch 129, wire 133 to the negative main. The starting solenoid now being energized will be raised and will bridge the contacts 134 and 135 by means of plate 136. The motor circuit will now be established from the positive main through wire 137, contacts 134, 135 and plate 136, wire 138, motor 41 (also shunt field 140 of this motor), and wire 139 to the negative main.

As already stated, it is desirable that whenever the table 6 is stopped in its shifting or grinding movement, it should be centered, or be in vertical alignment with the lower table 7. At the upper end of stub-shaft 38 is secured a disc 140, carrying a circular contact plate 141, which is broken away at one point as at 142, this break being in line with the pin 40. A pair of brushes 143 and 144 continuously bear upon this contact plate 141, the brushes being carried by the sleeve or column 30. Brush 143 is continuously in contact with the plate 141, but brush 144 passes out of contact every time the break 142 comes under this brush, which is positioned further from the center of shaft 38 than brush 143. A pair of annular contact rings 145 and 146 are embedded in suitable insulation in the outer surface of sleeve 30, and a pair of brushes 147 and 148, carried by journal-bearing 29, continuously bear on these rings. Ring 145 is joined to brush 143 by lead 149, whereas ring 146 is joined to brush 144 by lead 150. Wire 151 connects brush 147 with wire 132, while wire 152 connects brush 148 with wire 133. It will be seen that a shunt is formed around hand-switch 129, through wire 151, brush 147, ring 145, wire 149, brush 143, contact plate 141, brush 144, wire 150, ring 146, brush 148, and wire 152. Although this shunt circuit is broken every time break 142 in plate 141 comes under brush 144, this will have no effect on the control circuit as long as switch 129 is closed. Suppose now that at any time it is desired to stop the table 6. Switch 129 is opened. This will not immediately break the control circuits, unless break 142 happens at this time to be under brush 144. Otherwise the control circuit will be maintained through this shunt until the break 142 comes under brush 144. At this time, pin 40 is on the axis of sleeve 30 and the tables 6 and 7 are in vertical alignment. Now, since both shunt circuits are broken, the control circuit through solenoid coil 131 will be broken and the solenoid will drop, breaking the main motor circuit. At the same time, contact plate 153 at the bottom of the solenoid core will bridge the contacts 154 and 155. The motor 41, now running as a dynamo, due to the momentum of the moving parts, will be short-circuited across the following load: from the motor through wires 138 and 156, contact 155, bridge 153, contact 154, resistance 157 of the dynamic brake, wire 139 back to the motor 41. This load will almost instantly stop the motor. Of course, the motor may be started again by closing switch 129, regardless of the fact that the shunt circuit through plate 141 is now broken. As shown in the diagram of Fig. 10, the motor 41 has been stopped and the table 6 is in centered position.

When the grinding operation is to be started, the machine being stopped with the tables separated, a pair of similar sheets of glass are inserted, one against each table face, and are secured in place by turning on the vacuum, by means of valves 13 and 14. Suitable abrasive mixture is now applied to the surface of one or both of the sheets, and the switch 129 is closed to start the motor 41, which gives the grinding motion to upper table 6 and the sheet of glass carried thereby. When cam 91 closes switch 84, the lower motor 64 will move table 7 and the glass sheet carried thereby, into grinding engagement with the upper sheet. The grinding operation will continue for a predetermined interval, when the sheets will be automatically separated for a short period, during which they can be washed off if desired and new abrasive applied, and then they are automatically returned to grinding position and the grinding operation is renewed. This cycle of events is repeated automatically until the sheets have been ground down to the required fineness, when the operation is stopped by opening switch 129, preferably while the sheets are in grinding engagement. After the vacuum has been released from table 6 by opening valve 13, (or pet-cock 18), push-button 127 is closed, and the lower table 7 is moved to out position, carrying with it both sheets of glass. The upper sheet is removed, and the lower sheet washed off. By again pressing button 127, the tables are now brought together, and by manipulating the vacuum-control levers 14 and 13, the vacuum is cut off from the lower table 7 and supplied to the upper table 6, this operation transferring the remaining sheet from the lower table to the upper table. A pressure on switch-button 127 will now lower table 7 again, so that a new unground sheet may be applied to the lower table. We now have a sheet on the upper table whose upper surface has been ground and whose lower exposed surface is still unground. The lower sheet is unground on both sides. The grinding operation is renewed by closing switch 129, and after another series of grinding cycles have been accomplished we will have a completely ground sheet (that is, ground on both sides), on the upper table, and a sheet ground on its upper side only on the lower table. The completely ground sheet is now removed and the lower sheet transferred to the upper table as already described, and a new unground sheet inserted therebeneath. This series of operations may be continued indefinitely, and it will be noted that each time an unground sheet is inserted, a finished sheet ground on both sides, is removed. The process of removing and transferring the sheets may be accomplished very rapidly, and the complete grinding operation for a pair of sheets of drawn sheet-glass will require but a few minutes. If the tables are of the form shown in Fig. 8, for simultaneously grinding a plurality of pairs of sheets, the cycle of operations will be the same, except that each time a change of sheets is made, the upper sheet of each pair is removed, the remaining sheets are then simultaneously transferred to the upper table, and a series of new sheets inserted upon the lower table. Of course, it is obvious that this operation could be reversed, and the finished sheets removed from the lower table and the new sheets applied to the upper table. Or, if only a single pair of sheets are required these sheets may be ground on one side, both removed and reversed, and their other sides ground, thus simultaneously completing the two sheets.

The apparatus may be somewhat simplified by omitting the cam 79 from disc 59, and the cam 91 from disc 82. The table 7 will not stop automatically in out position but will return immediately to grinding position. The time interval, while the table is traveling out and in, will ordinarily be sufficient to wash off the sheet and apply new abrasive. In such an apparatus, the table 7 must be stopped in out position, to change sheets, by pushing button 98 at the proper time.

By means of this system and apparatus, sheet-glass, and especially drawn sheet-glass, which already has fairly flat surfaces, may be quickly and easily ground down till both surfaces are smooth and absolutely flat. Very little polishing is afterwards necessary to produce excellent plate-glass.

It should be understood that the specific form of apparatus here shown is merely one good example of a mechanism for carrying out the principles of this invention, and that many changes in the form and proportion of the various parts may be made without departing from the scope of the invention as set forth in the following claims. As an illustration, the motor-brakes need not be of the "dynamic" type, (although these have proven very efficient), but any form of electrically controlled brake could be used. For example, spring-applied brakes could be used on the armature-shaft, the brakes being held off when the motor is in operation by magnets or solenoids in series with the motor circuit. Such a brake is well-known and needs no further disclosure.

I claim:

1. In a sheet glass grinding apparatus, means to impart to a sheet of glass a continuous movement of translation in its own plane, consisting of a circular movement about an axis which continuously advances in a circular path, the center of the sheet and the center about which the axis advances coinciding once every revolution of the sheet, and means to stop the sheet only when these centers coincide.

2. In a sheet glass grinding apparatus, means to impart to a sheet of glass, a continuous movement of translation in its own plane, consisting of a circular movement about an axis which continuously advances in a circular path, the center of the sheet and the center about which the axis advances coinciding once every revolution of the sheet, the moving means comprising an operating motor, a manually controlled circuit to stop and start the motor, and an automatic circuit breaker in the circuit, driven from the moving means, and so arranged that when the sheet is stopped, the above named centers will coincide.

3. A machine for simultaneously grinding two sheets of glass one against the other, comprising a pair of sheet-supporting tables, one for each sheet, and means for imparting to one table and sheet a movement of translation in their own plane, consisting of a circular movement about an axis which continuously advances in a circular path, the respective edges of the sheets always remaining parallel, and coinciding once during every revolution of the moving sheet, and means to stop the moving sheet when the two sheets are centered.

4. A machine for simultaneously grinding two sheets of glass one against the other, comprising a pair of sheet-supporting tables, one for each sheet, and means for imparting to one table and sheet a movement of translation in their own plane, consisting of a circular movement about an axis which continuously advances in a circular path, the respective edges of the sheets always remaining parallel, and coinciding once during every revolution of the moving sheet, the sheet moving means comprising an operating motor, a manually controlled circuit to stop and start the motor, and an automatic circuit-breaker in the circuit, driven from the moving means, whereby when the moving sheet is stopped it will be centered with the other sheet.

5. In an apparatus for grinding sheet glass, a supporting frame, a sleeve member rotatably mounted in the frame, means for rotating the sleeve, an annular gear having a series of internal and external teeth, rotatably mounted on the sleeve, a stub-shaft eccentrically pivoted within the sleeve, a gear on the stub-shaft meshing with the internal teeth on the annular gear, driving means meshing with the external teeth on the annular gear, an eccentric driving pin carried by the gear on the stub-shaft, a holding table for the glass sheet, and driving connections between the table and the pin, whereby all points on the table and glass sheet have the same movement as the axis of the driving pin.

6. In an apparatus for grinding sheet glass, a supporting frame, a sleeve member rotatably mounted in the frame, means for rotating the sleeve, an annular gear having internal and external teeth, rotatably mounted on the sleeve, a stub-shaft eccentrically pivoted within the sleeve, a gear carried by the stub-shaft and meshing with the internal teeth on the annular gear, driving means meshing with the external teeth of the annular gear, an eccentric driving pin carried by the gear on the stub-shaft, a reciprocatory slide-member in which the driving pin pivots, a second slide-member in which the first slide-member has guiding trackways, the second slide-member reciprocating at right-angles to the first slide-member, trackways in the supporting frame for the second slide-member, a holding table for the glass sheet, and a yieldable connection between the table and the first slide-member.

7. In an apparatus for grinding sheet glass, a supporting frame, a train of driving gears carried by the frame, comprising a planetary pinion carrying an eccentrically positioned stud or pin, a pair of reciprocating slides moving at right-angles to one another, the outer slide being guided in the supporting frame, and the inner slide being guided in the outer slide, the stud or pin being journaled in and driving the inner slide, and a glass-sheet supporting table connected to and moving with the inner slide.

8. In an apparatus for grinding sheet glass, a supporting frame, a train of driving gears carried by the frame, comprising a planetary pinion carrying an eccentrically positioned stud or pin, a pair of reciprocating slides moving at right-angles to one another, the outer slide being guided in the supporting frame, and the inner slide being guided in the outer slide, the stud or pin being journaled in and driving the inner slide, a glass-sheet supporting table, and a yieldable connection between the table and the inner slide, whereby the table face is self-adjusting but the table moves with and has the same motion as the inner slide.

9. In a machine for grinding two sheets of glass one against the other, a pair of opposed sheet supporting tables, means for moving one table into and out of engagement with the other table, and holding them in yieldable engagement, and means for imparting to the other table a compound movement of translation in its own plane, the respective edges of the two tables always remaining parallel to one another.

10. In an apparatus for grinding two sheets of glass one against the other, means for imparting a grinding movement to one of the sheets in the plane of contact and automatic means for separating the sheets at predetermined intervals for a predetermined period and again bringing them into grinding contact.

11. In an apparatus for grinding two sheets of glass one against the other, means for imparting a grinding movement to one of the sheets in the plane of contact and automatic means for separating the sheets at predetermined intervals for a predetermined period and again bringing them into grinding contact, and timing mechanism for the separating means controlled from the grinding means.

12. In an apparatus for grinding two sheets of glass one against the other, means for imparting a grinding movement to one of the sheets in the plane of contact and automatic means for separating the sheets at predetermined intervals for a predetermined period and again bringing them into grinding contact, timing mechanism for the separating means controlled from the grinding means, and a warning signal device also controlled from the timing means to announce the approach of the sheets to their engaging positions.

13. In an apparatus for grinding sheet glass, a sheet supporting table, grinding mechanism, inclined trackways along which the table is slidable into and out of grinding position, a rotary crank-disc, mechanism operated from the crank-disc for moving the table along the trackways, a motor for driving the disc, a brake for the motor, a controller for the motor and brake, and timing mechanism for the controller actuated by the grinding mechanism.

14. In an apparatus for grinding sheet glass, a sheet supporting table, grinding mechanism, inclined trackways along which the table is slidable into and out of grinding position, a rotary crank-disc, mechanism operated from the crank-disc for moving the table along the trackways, a motor for driving the disc, a dynamic brake for the motor, a controller for the motor and brake, and timing mechanism for the controller actuated by the grinding mechanism.

15. In an apparatus for grinding sheet glass, a sheet supporting table, supports along which the table is slidable, a rotary crank-shaft, mechanism including a pitman driven from the crank-shaft for moving the table to and fro along the supports, a motor for driving the shaft, a brake for the motor, grinding mechanism above the table, a controller for the motor and brake, and timing mechanism for the controller, actuated by the grinding mechanism.

16. In an apparatus for grinding sheet glass, a sheet supporting table, supports along which the table is slidable, a rotary crank-shaft, mechanism including a pitman driven from the crank-shaft for moving the table along the supports, a motor for driving the shaft, a dynamic brake for the motor, grinding mechanism above the table, a controller for the motor and brake, and timing mechanism for the controller, actuated by the grinding mechanism.

17. In an apparatus for grinding sheet glass, a sheet supporting table, grinding mechanism, inclined trackways along which the table is slidable into and out of grinding relation with the grinding mechanism, a rack on the table, a fixed rack, a pinion meshing with the two racks at diametrically opposite points, a crank-disc, a pitman connecting the pinion and the disc, and a means for driving the disc.

18. In an apparatus for grinding sheet glass, a sheet supporting table, grinding mechanism, inclined trackways along which the table is slidable into and out of grinding relation with the grinding mechanism, a rack on the table, a fixed rack, a pinion meshing with the two racks at diametrically opposite points, a crank-disc, a pitman connecting the pinion and the disc, a motor for driving the disc, a brake for the motor, a controller for the motor and brake, and timing mechanism for the controller actuated from the grinding mechanism.

19. In an apparatus for grinding sheet glass, a sheet supporting table, grinding mechanism, inclined trackways along which the table is slidable into and out of grinding relation with the grinding mechanism, a rack on the table, a fixed rack, a pinion meshing with the two racks at diametrically opposite points, a crank-disc, a pitman connecting the pinion and the disc, a motor for driving the disc, and means controlled by the disc for stopping the motor when the table is in either in or out positions.

20. In an apparatus for grinding two sheets of glass one against the other, supporting tables for the two sheets, means for imparting to one table a continuous shifting movement in its own plane, means for moving the second table toward and from the first table, a motor for moving the second table, and timing mechanism actuated from the shifting means for the first table for controlling the motor, to move the second table toward and from the first at desired intervals.

21. In an apparatus for grinding two sheets of glass one against the other, supporting tables for the two sheets, means for imparting to one table a continuous shifting movement in its own plane, means for moving the second table toward and from the first table, a motor for moving the second table, a brake for the motor, and timing mechanism actuated from the shifting means for the first table for controlling the motor and brake, to move the second table toward and from the first at desired intervals.

22. In an apparatus for grinding two sheets of glass one against the other, opposed supporting tables for the two sheets, means for imparting a continuous horizontal shifting movement to the upper table and sheet, means for moving the lower table and sheet into and out of engagement with the first table, a motor for moving the lower table, and timing means actuated from the shifting means for the upper table for controlling the motor, to move the lower table in and out at desired intervals.

23. In an apparatus for grinding two sheets of glass one against the other, opposed supporting tables for the two sheets, means for imparting a horizontal shifting movement to the upper table and sheet, means for moving the lower table and sheet into and out of grinding engagement with the first table, a motor for moving the lower table, a brake for the motor, and timing means actuated from the shifting means for the upper table for controlling the motor and brake, to move the lower table in and out at desired intervals.

Signed at Toledo, in the county of Lucas, and State of Ohio, this 31st day of July, 1922.

JOSEPH P. CROWLEY.